US012613495B2

(12) United States Patent
Di Domenico et al.

(10) Patent No.: US 12,613,495 B2
(45) Date of Patent: Apr. 28, 2026

(54) HOROLOGICAL COMPONENT RESULTING FROM THE ASSEMBLY OF TWO PARTS AND METHOD FOR MANUFACTURING SAID COMPONENT

(71) Applicant: The Swatch Group Research and Development Ltd, Marin (CH)

(72) Inventors: Gianni Di Domenico, Neuchatel (CH); Dominique Lechot, Les Reussilles (CH); Pierre Cusin, Villars-Burquin (CH); Alex Gandelhman, Colombier (CH); Nicolas Livat, Cressier (CH)

(73) Assignee: The Swatch Group Research and Development Ltd, Marin (CH)

( * ) Notice: Subject to any disclaimer, the term of this patent is extended or adjusted under 35 U.S.C. 154(b) by 279 days.

(21) Appl. No.: 18/495,865

(22) Filed: Oct. 27, 2023

(65) Prior Publication Data

US 2024/0192641 A1 Jun. 13, 2024

(30) Foreign Application Priority Data

Dec. 13, 2022 (EP) .................................... 22213223

(51) Int. Cl.
*G04B 15/14* (2006.01)
*G04D 3/00* (2006.01)

(52) U.S. Cl.
CPC ........... *G04B 15/14* (2013.01); *G04D 3/0087* (2013.01)

(58) Field of Classification Search
CPC ...... G04B 15/14; G04B 13/02; G04D 3/0087; F16H 49/005; B29C 65/548
See application file for complete search history.

(56) References Cited

U.S. PATENT DOCUMENTS

| | | | | |
|---|---|---|---|---|
| 2009/0159200 | A1* | 6/2009 | Rossi | B29D 11/00307 264/319 |
| 2015/0177696 | A1 | 6/2015 | Born et al. | |
| 2019/0346812 | A1* | 11/2019 | Christan | G04B 17/325 |

FOREIGN PATENT DOCUMENTS

| | | | | |
|---|---|---|---|---|
| EP | 1520838 A1 * | 4/2005 | | B01J 19/0093 |
| EP | 2 887 156 B1 | 3/2018 | | |
| EP | 3 570 118 A1 | 11/2019 | | |
| EP | 3627242 B1 * | 7/2021 | | G04B 17/045 |
| WO | WO-2020148626 A1 * | 7/2020 | | B23K 35/264 |

OTHER PUBLICATIONS

EP-1520838-A1 Machine Translation from PE2E Search (Year: 2005).*

European Search Report issued May 4, 2023 in European Application 22213223.5 filed on Dec. 13, 2022, 3 pages (with English Translation of Categories of Cited Documents).

* cited by examiner

*Primary Examiner* — Regis J Betsch
*Assistant Examiner* — Kevin Andrew Johnston
(74) *Attorney, Agent, or Firm* — Oblon, McClelland, Maier & Neustadt, L.L.P.

(57) ABSTRACT

A horological component including a first part having a body provided with a first and a second cavity, the second cavity receiving a second part by engagement therewith, the first and second cavities being connected to each other by a capillary channel configured to allow the capillary flow of an adhesive from the first cavity to the second.

13 Claims, 1 Drawing Sheet

HOROLOGICAL COMPONENT RESULTING FROM THE ASSEMBLY OF TWO PARTS AND METHOD FOR MANUFACTURING SAID COMPONENT

CROSS-REFERENCE TO RELATED APPLICATION

This application claims priority to European Patent Application No. 22213223.5 filed on Dec. 13, 2022, the entire disclosure of which is hereby incorporated herein by reference.

TECHNICAL FIELD OF THE INVENTION

The invention relates to the field of horological components, and in particular relates to a horological component resulting from the assembly of at least two parts, and to a method for manufacturing said component.

In particular, the horological component can form a horological wheel set and more specifically an escape wheel.

The invention is particularly suited to providing a magnetic escape wheel capable of cooperating magnetically with a magnetic pallet-lever.

TECHNOLOGICAL BACKGROUND

In the horological industry, the manufacture of components is often complicated by their small dimensions. In particular, when components are produced by assembling a number of parts, it can be particularly complex to rigidly connect these parts to each other in a repeatable way, so as to ensure that the parts are properly held together and that the component complies with manufacturing tolerances.

In particular, by way of example, some horological movements include magnetic systems, i.e. sub-assemblies implementing components that cooperate with one another by magnetic interaction, in order to minimise friction and thus the associated energy losses.

For example, document EP3208667 describes a magnetic escapement mechanism comprising a magnetic escape wheel set comprising magnets.

One of the difficulties in implementing these devices lies in the construction of the wheel sets comprising the magnets. More specifically, since the magnets are only a few tens of thousands of a millimetre in size, the attachment thereof is a complex task.

The present invention offers a solution to overcome this drawback.

SUMMARY OF THE INVENTION

To this end, the invention relates to a horological component comprising a first part having a body provided with a first and a second cavity, said second cavity receiving a second part by engagement therewith, said first and second cavities being connected to each other by a capillary channel configured to allow the capillary flow of an adhesive from the first cavity to the second. The second part is thus attached within the second cavity by adhesive bonding. It should be noted that the first cavity is designed to facilitate deposition of the adhesive. In particular, its dimensions are adapted to the tool used to deposit the adhesive.

In particular embodiments, the invention can further include one or more of the following features, which must be considered singly or according to any combination technically possible.

In particular embodiments, the body has as many first cavities as second cavities.

In particular embodiments, the body has fewer first cavities than second cavities.

In particular embodiments, each first cavity is connected to a second cavity by a capillary channel specific thereto.

In particular embodiments, the one or more first cavities, the one or more second cavities and the capillary channels are not through-going.

In particular embodiments, the one or more first cavities, the one or more second cavities and the capillary channels are through-going.

In particular embodiments, the body is elastically deformable at the or at each second cavity so as to apply an elastic clamping force to the second part.

Another aim of the invention is to provide a horological wheel set formed by a horological component as previously described, said horological wheel set comprising several second cavities arranged at the periphery of the first part and evenly distributed around an axis of rotation of said wheel set, the second parts being formed by magnets.

In particular embodiments, the body is made of a non-magnetic material.

In particular embodiments, the body is made of silicon and has a silicon oxide coating.

In particular embodiments, the body of the first part comprises a felloe from which extends a plurality of teeth, in a radial plane, each tooth comprising a free end in which the second cavities are arranged, the first cavities being arranged in the felloe.

Another aim of the invention is to provide a magnetic escape wheel formed by a horological wheel set as described above.

Furthermore, another aspect of the present invention relates to a method for manufacturing a horological component comprising the following steps of:

- producing a body of a first part such that it comprises a first and a second cavity connected to each other by a capillary channel,
- producing a second part such that it has a shape complementary to the shape of the second cavity,
- engaging the second part in the second cavity,
- depositing an adhesive in the first cavity so that it flows by capillary action through the capillary channel into the second cavity.

BRIEF DESCRIPTION OF THE FIGURES

Other features and advantages of the invention will become apparent upon reading the following detailed description given by way of a non-limiting example, and with reference to the accompanying drawings, in which.

It should be noted that the figures are not necessarily drawn to scale for clarity purposes.

DETAILED DESCRIPTION OF THE INVENTION

Figure 1:
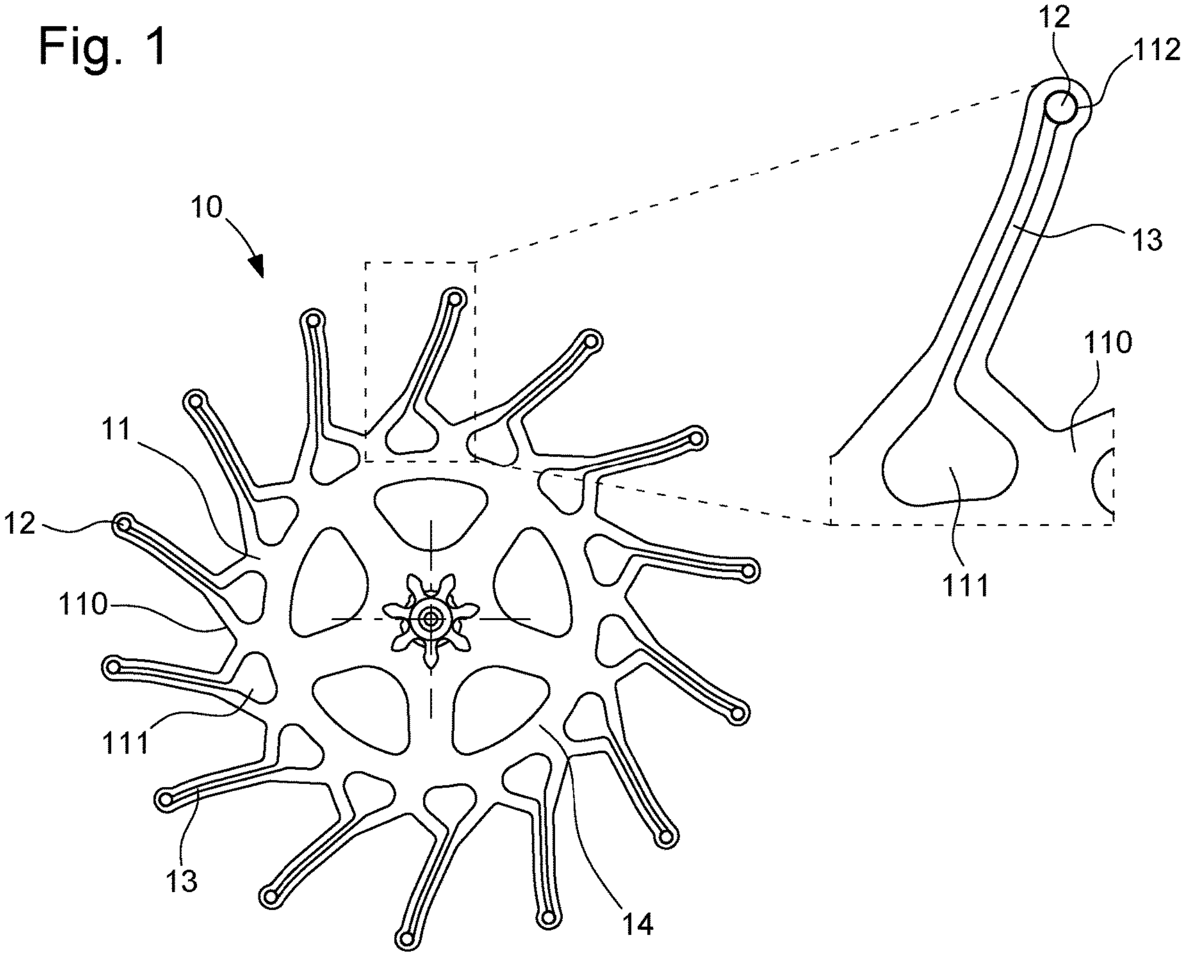
FIG. 1 diagrammatically shows a top view of a magnetic wheel set according to a preferred example embodiment of the invention, as well as a detailed view of a tooth of said wheel set.

As can be seen from the figures and in particular from the detailed view in FIG. 1, the present invention relates to a horological component 10 comprising a first part 11 having a body 110 provided with at least one first and at least one second cavity 111 and 112, the or each second cavity 112 receiving a second part 12 by engagement therewith.

In the following, the invention is described with reference to a single first and a single second cavity 111 and 112 in order to simplify the reading and understanding of the present description. It should be noted, however, that as previously described, the horological component 10 may comprise one or more first cavities 111 and one or more second cavities 112, each of which receives a second part 12 by engagement therewith.

The second cavity 112 and the second part 12 have complementary shapes so that they are adapted to cooperate with each other in an interlocking, i.e. fitting, relationship, with or without mechanical play.

The first and second cavities 111 and 112 are connected to each other by a capillary channel 13 configured to allow the capillary flow of an adhesive from the first cavity 111 to the second cavity 112. This feature enables the second part 12 to be attached to the first part 11 by adhesive bonding in a simple, rapid and repeatable manner.

Indeed, attaching the second part 12 to the body 110 of the first part 11 is greatly simplified in that adhesive must simply be deposited in the first cavity 111 so that it can then flow by capillary action through the capillary channel 13 to the second cavity 112. It is understood here that once the adhesive has flowed to the second cavity 112, a film of adhesive forms between the second part 12 and the first part 11, and in particular between the second part 12 and the wall of the second cavity 112 which said second part 12 is facing, thanks to the same physical phenomenon of capillarity.

It should be noted that a person skilled in the art will be able to find a commercially-available horological adhesive suitable for producing the invention.

Thanks to the present invention, the assembly of the horological component 10 does not require any particular skill on the part of an operator or investment in a complex and expensive assembly machine.

Figure 2:
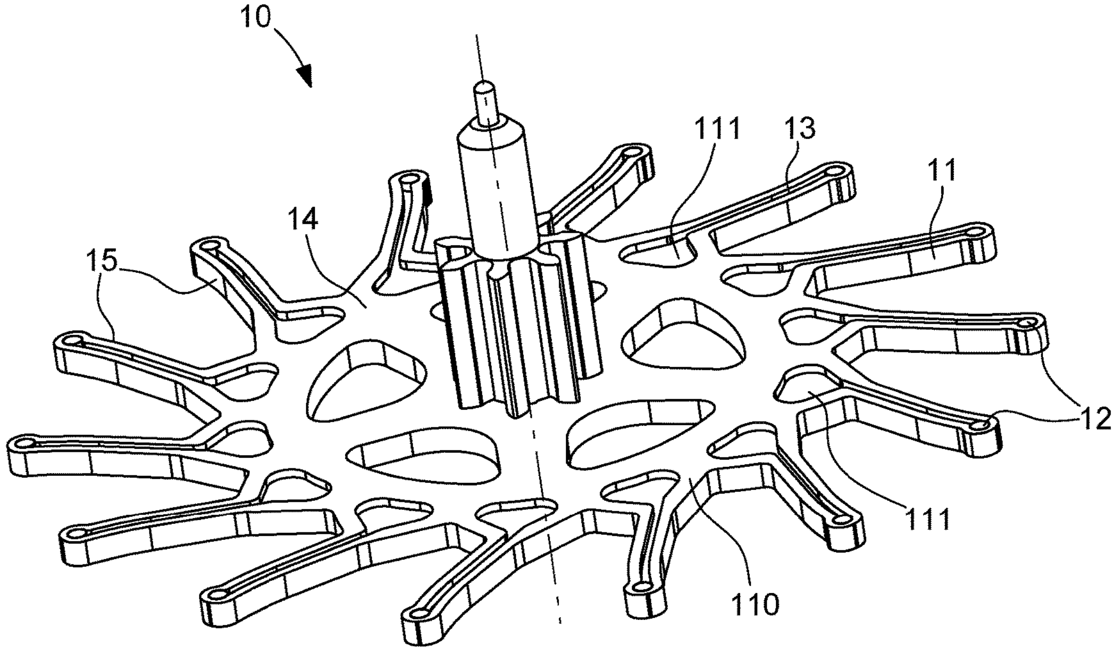
FIG. 2 shows a perspective view of the wheel set shown in FIG. 1.

Preferably, as shown in FIG. 2, the first cavity 111, the second cavity 112 and the capillary channel 13 are not through-going, but extend in depth over only part of the thickness of the body 110 of the wheel set, as shown in FIG. 2.

This feature ensures that the adhesive deposited in the first and second cavities 111 and 112 does not flow anywhere else other than into the capillary channels 13. Consequently, in addition to facilitating the manufacture of the horological component 10 insofar as no special fitting is required to guide the capillary flow of the adhesive or to prevent any leakage thereof, this feature ensures that the second part 12 is bonded against the second cavity 112.

However, in another embodiment of the invention, the first cavity 111, the second cavity 112 and the capillary channel 13 are through-going, i.e. they open out on either side of the body 110 of the first part 11.

This feature has the advantage of simplifying the manufacture of the body 110 of the first part 11, insofar as the first cavity 111, the second cavity 112 and the capillary channel 13 can be produced without the need to adhere to any dimensional depth requirements. Moreover, the second cavity 112 can be elastically deformable, enabling an elastic clamping force to be applied to the second part 12, thereby ensuring that the second part 12 is held in position within the second cavity 112 prior to the adhesive bonding thereof. This clamping force also ensures that the second part 12 is attached to the body 110 of the first part 11, in addition to the adhesive bonding.

The body 110 can have as many first cavities 111 as second cavities 112, as shown in FIGS. 1 and 2. This feature ensures that the adhesive is distributed uniformly throughout all of the second cavities 112.

Alternatively, the body 110 of the first part 11 may have fewer first cavities 111 than second cavities 112. In this embodiment of the invention, the or each first cavity 111 is connected to several capillary channels 13. This feature simplifies the construction of the horological component 10, insofar as the adhesive must be applied in few first cavities 111, and the latter have larger dimensions, since they are each adapted to receive a sufficient volume of adhesive to bond all of the second parts 12 housed in the second cavities 112 to which they are connected.

Preferably, each first cavity 111 is connected to a second cavity 112 by a capillary channel 13 specific thereto. The same capillary channel 13 can conceivably connect several second cavities 112 in order to simplify the manufacture of the body 110 of the first part 11; however, this solution is less preferred insofar as the distribution of adhesive to each of these second cavities 112 is more complex to control for it to be uniform.

In a preferred example embodiment of the present invention, the horological component 10 forms a horological wheel set comprising a plurality of second cavities 112. As shown in FIGS. 1 and 2, the second cavities 112 are arranged at the periphery of the first part 11 and are evenly distributed around an axis of rotation of said wheel set, in the same way as the first cavities 111, in order to avoid any unbalance during rotation of the wheel set. Advantageously, the one or more second parts 12 are formed by magnets.

As shown in FIGS. 1 and 2, the body 110 of the first part 11 comprises a felloe 14 from which a plurality of teeth 15 extend, in a radial plane. Each tooth 15 comprises a free end in which the second cavities 112 and the magnets are arranged, the first cavities 111 being arranged in the felloe 14.

In this preferred example embodiment of the invention, the magnets and the second cavities 112 have a cylindrical shape with a circular cross-section, and each magnet cooperates with a second cavity 112 in a friction fit to enable it to be held in position before adhesive bonding.

Advantageously, the horological wheel set forms a magnetic escape wheel, as shown in FIGS. 1 and 2.

Advantageously, the body 110 is made of a non-magnetic material, i.e. this material is not attracted or repelled by a magnet. Non-limiting examples include silicon, silicon oxide, and glass, etc. The use of silicon for the body 110 with a silicon oxide coating has the advantage of combining good mechanical strength with low density, and hence low moving inertia 10.

Advantageously, the arbor of the magnetic escape wheel is also made of a non-magnetic, or optionally a weakly magnetic, material, The present invention also relates to a method for manufacturing a horological component 10 comprising the following steps of:

- producing the body 110 of the first part 11 such that it comprises a first and a second cavity 111 and 112 connected to each other by a capillary channel 13,
- producing a second part 12 such that it has a shape complementary to the shape of the second cavity 112,
- engaging the second part 12 in the second cavity 112,
- depositing an adhesive in the first cavity 111 such that it flows by capillary action through the capillary channel 13 to the second cavity 112.

More specifically, the step of producing the body 110 of the first part 11 may comprise the operations of machining the body 110 from a blank and of etching the first and second cavities 111 and 112 and the capillary channel 13.

The steps of producing the first and second parts 11, 12 are independent of each other in the sense that they can be implemented in parallel or one before the other.

More generally, it should be noted that the implementations and embodiments considered above have been described by way of non-limiting examples, and that other alternatives are therefore possible.

The invention claimed is:

1. A horological component comprising:

a first part that is part of a wheel set of a horological movement of a timepiece, the first part having a body provided with a first cavity and a second cavity; and a second part, said second cavity receiving the second part by engagement therewith, wherein said first and second cavities are connected to each other by a capillary channel configured to allow the capillary flow of an adhesive from the first cavity to the second cavity.

2. The horological component according to claim 1, wherein the body has as many first cavities as second cavities.

3. The horological component according to claim 1, wherein the body has fewer first cavities than second cavities.

4. The horological component according to claim 1, wherein the horological component includes more than one of the first cavity and more than one of the second cavity, and each of the first cavities is connected to a respective one of the second cavities by a capillary channel specific thereto.

5. The horological component according to claim 1, wherein the first cavity, the second cavity, and the capillary channel are not through-going.

6. The horological component according to claim 1, wherein the first cavity, the second cavity, and the capillary channel are through-going.

7. The horological component according to claim 6, wherein the body is elastically deformable at the second cavity so as to apply an elastic clamping force to the second part.

8. The horological component according to claim 1, wherein said horological component comprises several of the second cavity arranged at a periphery of the first part and evenly distributed around an axis of rotation of said first part, the second parts being formed by magnets.

9. The horological component according to claim 8, wherein the body of the first part comprises a felloe from which extends a plurality of teeth, in a radial plane, each tooth comprising a free end in which the second cavities are arranged, the first cavities being arranged in the felloe.

10. The horological component according to claim 1, wherein the body is made of a non-magnetic material.

11. The horological component according to claim 10, wherein the body is made of silicon and has a silicon oxide coating.

12. A magnetic escape wheel formed by the horological component according to claim 8.

13. A method for manufacturing a horological component, the method comprising:

producing a body of a first part such that said body comprises a first cavity and a second cavity connected to each other by a capillary channel, the first part being a part of a wheel set of a horological movement of a timepiece, producing a second part such that said second part has a shape complementary to the shape of the second cavity, engaging the second part in the second cavity, depositing an adhesive in the first cavity such that said adhesive flows by capillary action through the capillary channel to the second cavity.

* * * * *